(12) United States Patent
Rustomji et al.

(10) Patent No.: US 12,586,873 B2
(45) Date of Patent: Mar. 24, 2026

(54) CONDUCTIVE POWER ROD FOR ELECTROCHEMICAL CELL

(71) Applicant: SOUTH 8 TECHNOLOGIES, INC., San Diego, CA (US)

(72) Inventors: Cyrus S. Rustomji, San Diego, CA (US); Josh Lukens, San Diego, CA (US); Nick Wayland, Encinitas, CA (US)

(73) Assignee: South 8 Technologies, Inc., San Diego, CA (US)

( * ) Notice: Subject to any disclaimer, the term of this patent is extended or adjusted under 35 U.S.C. 154(b) by 0 days.

(21) Appl. No.: 18/740,195

(22) Filed: Jun. 11, 2024

(65) Prior Publication Data

US 2024/0356173 A1    Oct. 24, 2024

Related U.S. Application Data

(63) Continuation of application No. PCT/US2024/033428, filed on Jun. 11, 2024.

(Continued)

(51) Int. Cl.
*H01M 50/534* (2021.01)
*H01M 50/107* (2021.01)
(Continued)

(52) U.S. Cl.
CPC ....... *H01M 50/534* (2021.01); *H01M 50/107* (2021.01); *H01M 50/3425* (2021.01);
(Continued)

(58) Field of Classification Search
CPC .... H01M 50/107; H01M 50/154; H01M 4/75; H01M 50/3425; H01M 50/578; H01M 50/545; H01M 50/567; H01M 50/528
See application file for complete search history.

(56) References Cited

U.S. PATENT DOCUMENTS 5,171,648 A * 12/1992 Beard ................. H01M 50/578
                                                            429/61
5,736,270 A *  4/1998 Suzuki ............... H01M 50/538
                                                            429/94
(Continued)

FOREIGN PATENT DOCUMENTS

JP           3658816       6/2005
JP     2008243704 A * 10/2008   ............. Y02E 60/10
(Continued)

OTHER PUBLICATIONS

Li et al., "Progress in electrolytes for rechargeable Li-based batteries and beyond", Green Energy & Environment 1 (2016) 18-42, http://dx.doi.org/10.1016/j.gee.2016.04.006 (Year: 2016).*
(Continued)

*Primary Examiner* — Jessie Walls-Murray
(74) *Attorney, Agent, or Firm* — Manuel de la Cerra

(57)                ABSTRACT

Disclosed herein is a design for an electrochemical energy-storage device. The device includes an electrode assembly with a separator that separates a positive electrode and a negative electrode. These electrodes and separator are radially coiled about a central axis to form a central void. A positive electrode current collector is in electrical contact with the positive electrode, while a negative electrode current collector is in electrical contact with the negative electrode. A conductive power rod is positioned in the central void and provides structural support to prevent the collapse of the central void. The rod is either: (a) in electrical contact with the positive electrode current collector and provides a low-resistance current path with a positive terminal; or (b) in electrical contact with the negative electrode current collector and provides a low-resistance current path with a negative terminal. Both terminals are electrically isolated from each other.

11 Claims, 12 Drawing Sheets

Related U.S. Application Data

(60) Provisional application No. 63/461,252, filed on Apr. 22, 2023.

(51) Int. Cl.

| | |
|---|---|
| *H01M 50/179* | (2021.01) |
| *H01M 50/342* | (2021.01) |
| *H01M 50/545* | (2021.01) |
| *H01M 50/548* | (2021.01) |
| *H01M 50/567* | (2021.01) |
| *H01M 50/578* | (2021.01) |

(52) U.S. Cl.
CPC ....... *H01M 50/545* (2021.01); *H01M 50/548* (2021.01); *H01M 50/578* (2021.01); *H01M 50/179* (2021.01); *H01M 50/567* (2021.01); *H01M 2200/20* (2013.01)

(56) References Cited

U.S. PATENT DOCUMENTS

| | | | |
|---|---|---|---|
| 6,114,059 A * | 9/2000 | Watanabe ........... | H01M 10/654 |
| | | | 429/82 |
| 11,460,505 B1 | 10/2022 | Patrissi et al. | |
| 2003/0186566 A1 | 10/2003 | Maruyama | |
| 2004/0131924 A1 * | 7/2004 | Anglin ................. | H01M 10/28 |
| | | | 29/623.2 |
| 2004/0258987 A1 * | 12/2004 | Shin .................. | H01M 10/0431 |
| | | | 429/163 |
| 2008/0182159 A1 * | 7/2008 | Mitani .............. | H01M 50/3425 |
| | | | 429/56 |
| 2009/0117451 A1 * | 5/2009 | Jung ................. | H01M 50/3425 |
| | | | 429/56 |
| 2014/0377610 A1 * | 12/2014 | Kwon .............. | H01M 10/0431 |
| | | | 29/623.5 |
| 2016/0118681 A1 * | 4/2016 | Park .................. | H01M 10/0431 |
| | | | 429/94 |
| 2016/0301118 A1 * | 10/2016 | Chami ................ | H01M 10/613 |
| 2018/0183067 A1 | 6/2018 | Nanotek | |
| 2022/0231345 A1 | 7/2022 | Hwangbo et al. | |
| 2022/0407157 A1 * | 12/2022 | Nogami ............. | H01M 50/107 |
| 2023/0064158 A1 * | 3/2023 | Yoshida ............. | H01M 50/559 |
| 2024/0120626 A1 * | 4/2024 | Lee ..................... | H01M 50/186 |

FOREIGN PATENT DOCUMENTS

| | | | | |
|---|---|---|---|---|
| KR | 20070118412 A | * | 12/2007 | ......... H01M 50/572 |
| WO | WO-2022254024 A1 | * | 12/2022 | ......... H01M 50/179 |

OTHER PUBLICATIONS

International Search Report for PCT/US24/33428 dated Sep. 6, 2024 (9 pages).

* cited by examiner

CONDUCTIVE POWER ROD FOR ELECTROCHEMICAL CELL

CROSS-REFERENCE TO RELATED APPLICATIONS

This application claims priority as a continuation of PCT/US24/33428 filed on Jun. 11, 2024, which claims priority to U.S. application Ser. No. 63/461,252, filed on Apr. 22, 2023, all the contents of each of these applications are incorporated by reference.

This application is related to the following applications and patents, each of which is hereby incorporated by reference in its entirety: U.S. Pat. No. 10,608,284 issued on Mar. 31, 2020; U.S. Pat. No. 10,998,143 issued on May 4, 2021; U.S. Pat. No. 10,784,532 issued on Sep. 22, 2020; U.S. Pat. No. 11,088,396 issued Aug. 10, 2021; U.S. Pat. No. 10,873,070 issued on Dec. 22, 2020; U.S. Pat. No. 11,342,615 issued on May 24, 2022; PCT/US20/26086 filed on Apr. 1, 2020; PCT/US22/31594 filed on May 31, 2022; PCT/US23/11864 filed on Jan. 30, 2023; PCT/US23/17720 filed on Apr. 6, 2023; PCT/US23/28104 filed on Jul. 19, 2023; PCT/US23/28105 filed on Jul. 19, 2023; PCT/US23/35766 filed on Oct. 24, 2023; PCT/US24/18746 filed on Mar. 6, 2024; PCT/US24/16784 filed on Feb. 21, 2024; PCT/US24/25771 filed on Apr. 23, 2024; U.S. Application 63/418,703 filed on Oct. 24, 2022; U.S. application Ser. No. 63/461,252 filed on Apr. 22, 2023; U.S. Application 63/461,387 filed on Apr. 24, 2023; U.S. application Ser. No. 63/470,174 filed on May 31, 2023; U.S. Application 63/534,213 filed on Aug. 22, 2023; U.S. application Ser. No. 63/450,745 filed on Mar. 8, 2023; U.S. application Ser. No. 63/652,616 filed on May 28, 2024; and PCT/US24/31325 filed on May 29, 2024.

FIELD OF THE INVENTION

This invention relates to mechanical design of a cylindrical battery cell, which utilizes a jelly roll style construction having a positive and negative electrode wound with a separator, called the "electrode assembly", impregnated with an ionically-conductive electrolyte, such as a liquid or liquefied gas electrolyte, and housed in a mechanically rigid housing.

BACKGROUND OF THE INVENTION

In a cylindrical battery construction, interconnect tabs for positive and negative electrodes are typically located on opposite ends of the electrode assembly, which is a coiled assembly of positive and negative active electrodes, positive and negative current collectors, and separator material. This means that during the manufacturing process one electrode is first electrically connected via welding, bonding, or similar process to a cell current collector and housing component to make electrical connection to the external portion of the cell. Often, connections are made on opposite sides of the electrode assembly.

In this typical cylindrical battery configuration, with electrodes internally connected to the opposite sides of the battery, the battery housing itself, referred to as the cell "can", may be used as an electrical contact to conduct electrical current across the whole length of the battery cell. This approach is used to allow for advanced battery pack integration for electric vehicles and other applications, requiring positive and negative battery terminals to be accessible from the same side of the battery cell. To meet the electrical performance with high conductivity and low resistance, this configuration requires the use of nickel-plated mild carbon steels, such as DC04 for the battery can/cylindrical packaging. Structurally more robust materials, such as stainless steels, or titanium, cannot be used in this configuration because of these materials' high electrical resistance.

Nevertheless, implementing these robust materials with higher mechanical strength, regardless of higher electrical resistance, would benefit battery cell construction to ensure a safer package. Alternatively, a thicker can wall may be used to compensate for a lower conductivity, however, this would add undesirable mass and volume to the cell. Further, a more robust cell would be beneficial for applications involving with high-pressure electrolytes, which may lead to cell bulging, leaking, or even catastrophic failure under harsh chemical or pressurization conditions.

A cell with high-pressure electrolytes may also experience significant deflection or outward bulging about the cell housing ends. Thicker top and bottom ends may be used to stiffen the circular members experiencing the internal pressure to reduce deflection, but again, that is undesirable, since that would add mass and volume. Also, if a drawn can is used for the cell manufacturing, there are limitations to how much thicker the ends of the can may be compared to the thickness of the side walls.

A vent or a burst disk is common in cell designs to relieve internal cell pressure beyond a certain threshold—e.g. thermal runaway creating the rapid increase of temperature and pressure within the cell. In some cell designs, when the vent opens, a projectile is ejected from the cell, which may be undesirable in certain applications.

Many Li-ion cells also integrate another safety mechanism, a current interrupt device (CID), designed to permanently cut off the flow of current, often as protection from overcharging.

As cells grow larger, cooling cells during high C-rate (current rate) charging or discharging becomes a challenge. High C-rate charging is desirable across most industries to reduce charging time. These cells are generally cooled from one end of the cylinder or along the sidewalls. Nevertheless, high C-rate charging is still limited because of excessive heating.

Additionally, as a cell undergoes many thermal and charging/discharging cycles, the electrode-active material in a jelly roll style battery may experience swelling that may result in the collapse or deformation of the center of the jelly roll over time. This may lead to catastrophic short-circuiting or cell performance degradation.

New cell-can designs are needed to overcome these shortcomings, including a vent that opens without ejection of projectiles, a thermal path through the center of the cell to reduce heating, and a central mandrel pin to prevent jelly roll collapse.

SUMMARY OF THE INVENTION

Disclosed herein is a description of a novel conductive power rod for an electrochemical cell. Specifically, a conductive power rod is inserted through the mandrel hole or central void of a jelly roll and attached to neither (floating), one (semi-floating) or both (structural) ends of a cylindrical cell housing or terminals to offer a variety of benefits, forming floating, semi-floating, and structural configurations.

Specifically, disclosed herein is a design for an electrochemical energy storage device that includes an electrode assembly with a separator that separates a positive electrode and a negative electrode. These electrodes and separator are radially coiled about a central axis to form a central void. A positive electrode current collector is in electrical contact with the positive electrode, while a negative electrode current collector is in electrical contact with the negative electrode. A conductive power rod is positioned in the central void and provides structural support to prevent the collapse of the central void. The rod is either: (a) in electrical contact with the positive electrode current collector and provides a low resistance current path with a positive terminal; or (b) in electrical contact with the negative electrode current collector and provides a low resistance current path with a negative terminal. Both terminals are electrically isolated from each other.

The device may include an ionically-conducting electrolyte that is in contact with the electrode assembly. The electrolyte may be a liquid or a liquefied gas.

The device may include a can housing that encloses the various components. The housing may further act as either the positive terminal or the negative terminal. The housing may have a first end and a second end, either of which, or both, may be connected to the conductive power rod. The rod can thereby provide structural support to the can housing to prevent deflection of the ends when the device experiences above-normal operating internal pressure.

The housing may also have a vent that opens when the device experiences above-normal operating internal pressure. The conductive power rod may be connected to the vent. The rod may further include a flexure element constructed to elongate when the device experiences above-normal operating internal pressure, thereby retaining the vent portion of the cell and preventing projectiles.

The conductive power rod may have a notch that fractures when the device experiences above-normal operating internal pressure. This fracture severs the low resistance current path. The conductive power rod may be made of a cable (stranded or not) or may be hollow. The rod may have a cross-section that is round, square, hexagonal, triangular, tubular, or round slotted. The rod may be made of carbon steel, stainless steel, copper, aluminum, molybdenum, titanium, or alloys thereof.

The device may also have a rivet that acts as either the positive terminal or the negative terminal. The device may be a battery or a capacitor.

Depending on the device configuration and conductive power rod geometry, the benefits of the present invention include: a lower resistance electrical path for an electrode though the center of the jelly roll, enabling high power capability with a mechanically robust cell housing; mechanical reinforcement of the housing's ends to reduce deflection for a cell with a positive internal pressure, allowing a cell vent to open with or without a projectile, addition of a CID (current interrupt device), more efficient cell cooling by providing a thermally conductive heat path from the center of the jelly roll to an end of the cell housing; and preventing jelly roll central void collapse.

Additional aspects, alternatives and variations, as would be apparent to persons of skill in the art, are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

DETAILED DESCRIPTION OF THE INVENTION

Figure 1B:
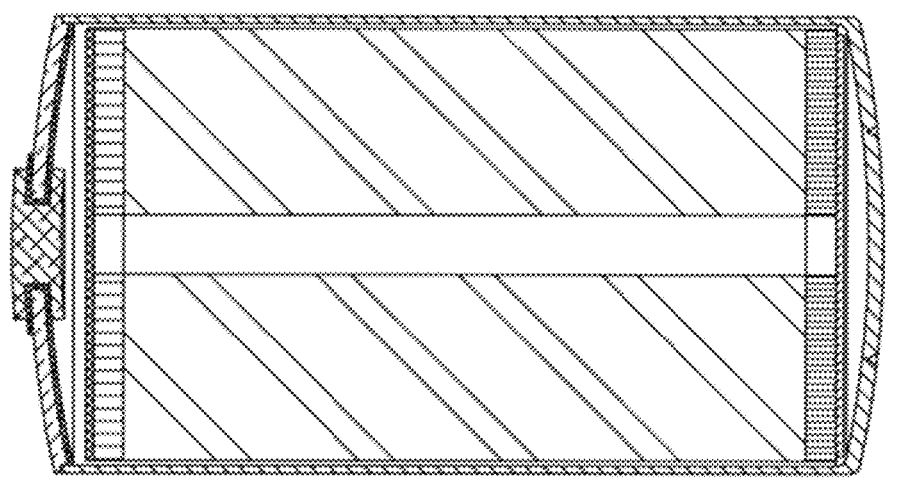
FIG. 1B illustrates the cell can of FIG. 1A experiencing significant deflection about both ends from elevated internal pressure.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention, as defined by the appended claims.

In the following description, numerous specific details are set forth to provide a thorough understanding of the present invention. Example embodiments of the present invention may be implemented without some or all these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms, unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

The following list of example features corresponds with the attached figures and is provided for ease of reference, where like reference numerals designate corresponding features throughout the specification and figures:

1 Electrically-Insulating Gasket Seal
2 Rivet
3-3.17 Electrical Weld or Contact Point
4 First Can End
4.1 Second Can End
5 Positive Electrode Current Collector
5.1 Positive Terminal
6 Positive Electrode Jelly Roll Foil
7 Jelly Roll
7.1 Separator
7.2 Electrode Assembly
7.3 Central Axis
7.4 Central Void
7.5 Ionically Conductive Electrolyte
8 Can Housing
9 Negative Electrode Jelly Roll Foil
10 Negative Electrode Current Collector
10.1 Negative Terminal
11 Vent 12 Conductive Power Rod
13 Electrical Insulator
14 Positive Conductive Tab
15 Negative Conductive Tab
16 Cell Inner Lid
17 Electrically Insulating Glass/Ceramic to Metal or Gasket Seal
18 Bonded Structural Insulator
19 Electrically Insulated Mechanically Bonded Surface
20 Power Rod Notch
21 Fractured Power Rod
22 Power Rod Bonded Surface Failure Point
23 Power Rod Flexure Element
24 Power Rod Flexure Element in Extended State
25 Pressure-Relief Path Disclosed is a description of a conductive power rod, how it can be integrated into a cylindrical battery cell, and what benefits various configurations can provide. A discussion of an example cell design without a conductive power rod serves as a useful reference before describing details of power rod configurations, geometries, and benefits. An example cell can design utilizing a "tab-less" jelly roll without a conductive power rod is presented in FIG. 1A. The cell is comprised of an end 4 hermetically and structurally attached to a drawn can housing 8, all of which form the negative terminal 10.1 of the cell; however, a configuration with this representing the positive terminal is also possible. The positive terminal 5.1 is the rivet 2, which is electrically isolated from the end 4 by the electrically-insulating gasket 1, which also forms a hermetic seal. The cell includes a vent 11, which may be part of either the end 4 or part of the can housing 8. The vent 11 opens when the device experiences above-normal operating internal pressure, allowing the electrolyte to escape, disabling the device. These above normal pressures can be caused, for example, by damage to the device that creates a short leading to thermal runaway—raising internal pressure and temperature. Above-normal operating internal pressure may preferably be 200% higher than the expected pressure during device operation, or more preferably 100% and even more preferably 50%. FIG. 1C shows the rather significant deflection a sample 46 mm diameter, 0.6 mm thick bottom, drawn DC04 steel can may experience as internal pressure increases. For this example, above 500 psi may be considered above-normal operating pressure. This deflection is undesirable for conforming into battery pack applications; a structural conductive power rod 12, under tension, would reduce or eliminate the undesired deflection.

Inside the can housing 8 lies the electrode assembly or jelly roll 7. Shown is a "tab-less" design with all the positive and negative current collector foil completely exposed and attached to a terminal; however, a single-tab or multiple-tab jelly roll 7 can also be implemented. The positive electrode jelly roll foil 6 is electrically and structurally attached to the positive electrode current collector 5, which is electrically and structurally attached via an electrical weld or contact point 3.1 to the positive rivet terminal 2, 5.1. The negative electrode jelly roll foil 9 is electrically and structurally attached to the negative electrode current collector 10, which is electrically and structurally attached to the negative can housing 8 via an electrical weld or contact point 3.2. An ionically conducting electrolyte 7.5 is in contact with the jelly roll 7. The electrolyte 7.5 may be a liquid electrolyte or a liquefied gas electrolyte.

This cell can design has several drawbacks. First, the can walls are used to carry current, preventing the use of stronger but more electrically-resistive can wall materials.

Second, the weaker cell can materials may result in significant displacement or bowing about the ends of the can during excess internal pressure, as shown in FIG. 1B. Third, the vent may eject a projectile disk. Fourth, the lack of a CID decreases the safety of the cell can. Fifth, it is difficult, if not impossible, to cool this design effectively during high C-rates. Finally, the jelly roll central void may collapse after heat cycling.

Figure 1A:
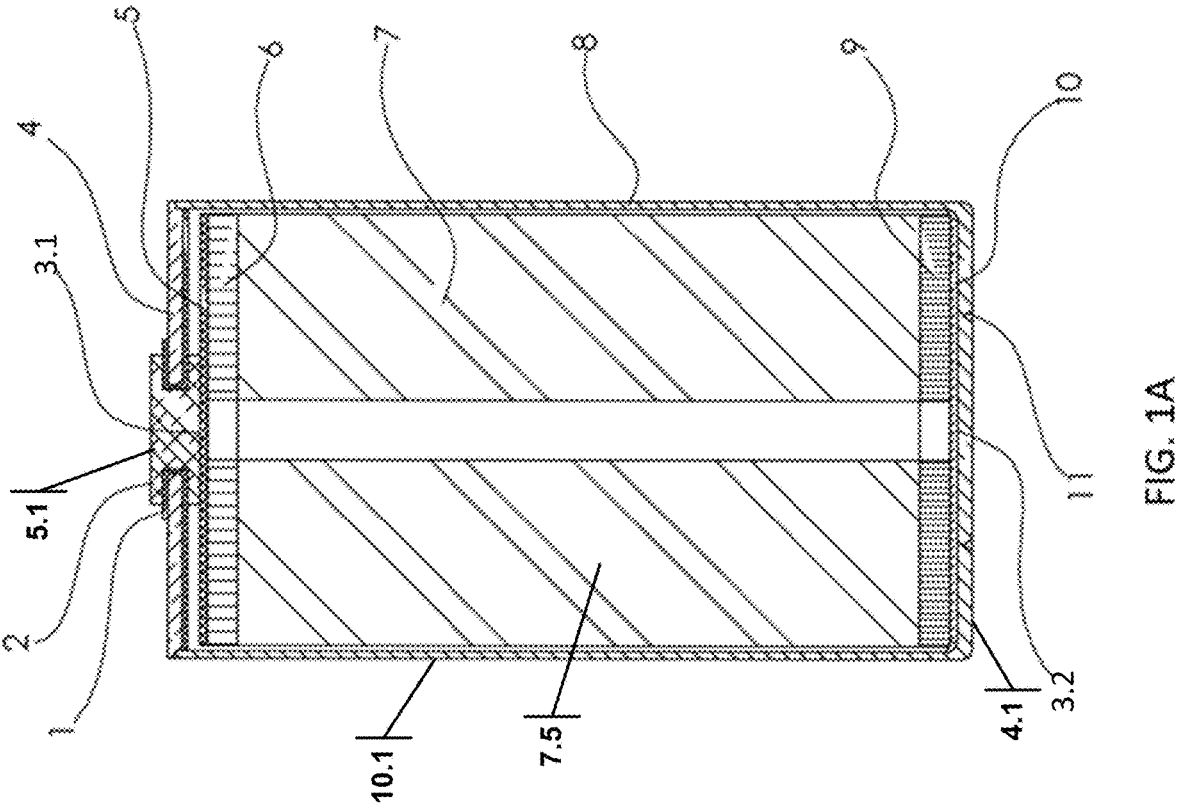
FIG. 1A illustrates an example cell can design without a conductive power rod.
Figure 1C:
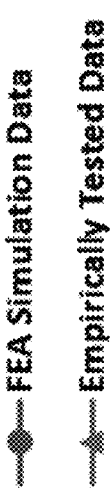
FIG. 1C is a graphical illustration of the deflection of a 46 mm diameter drawn DC04 steel can with 0.6 mm bottom thickness as internal cell pressure increases, using both FEA simulation data and empirically tested data.
Figure 1C:
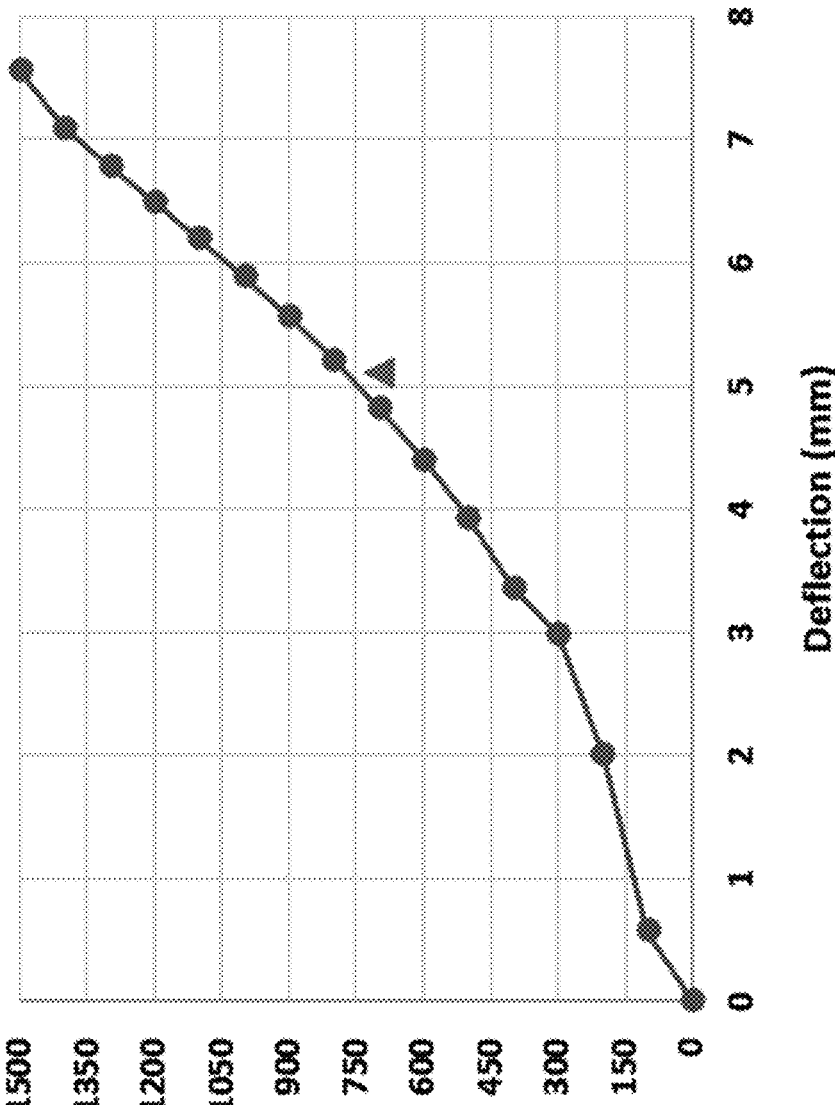
Figures 1D, 1E, 1F:
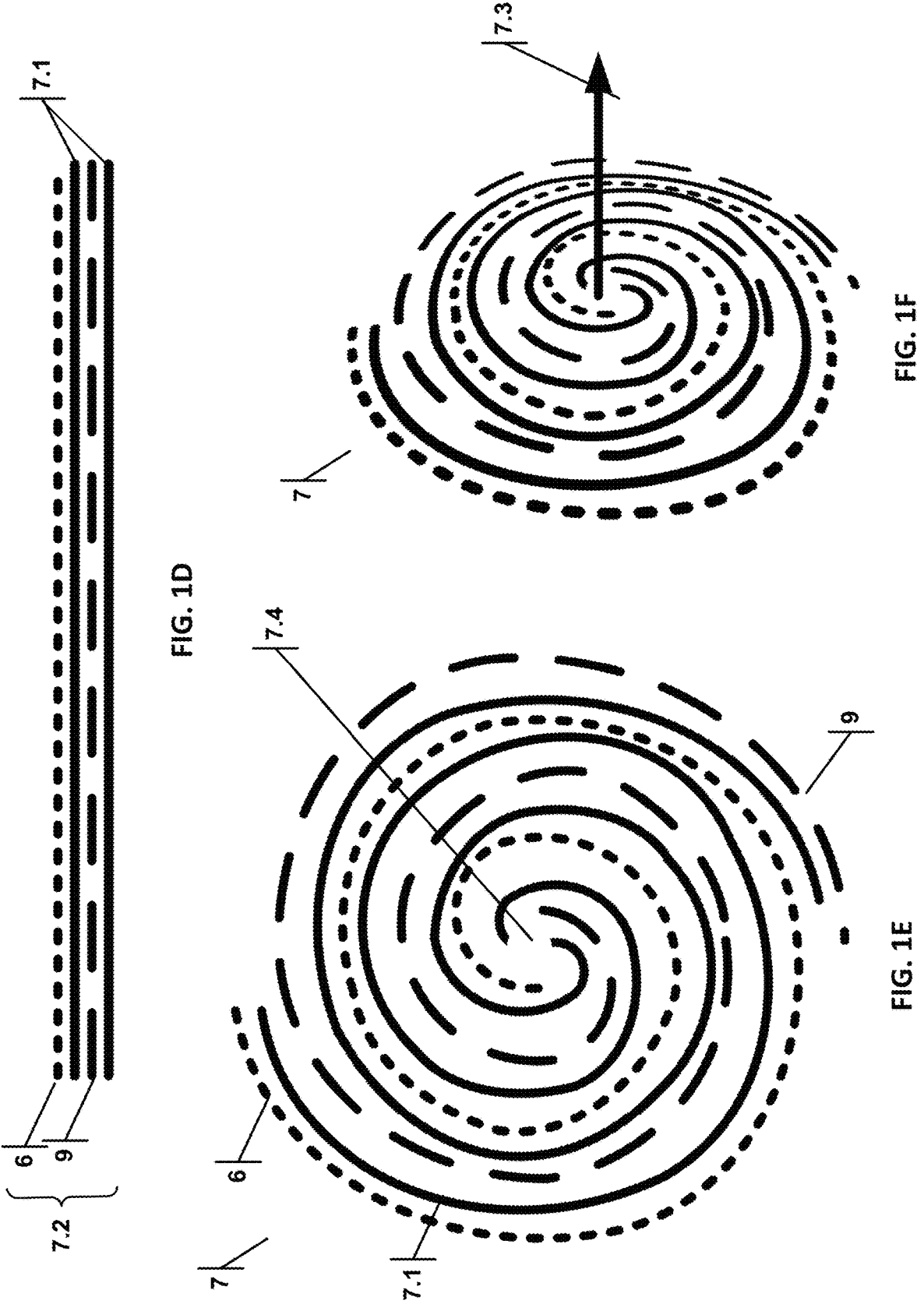
FIG. 1D illustrates an electrode assembly before coiling.
FIG. 1E illustrates the electrode assembly coiled to form a jelly roll.
FIG. 1F illustrates the jelly roll in a perspective view to show the central axis.

FIG. 1D illustrates the electrode assembly 7.2 before coiling. It is made up of a separator 7.1 separating a positive electrode jelly roll foil 6 and a negative electrode jelly roll foil 9. The electrode assembly 7.2 may be coiled about a central axis 7.3 to form the jelly roll 7 with a central void 7.4, as shown in FIGS. 1E and 1F. An ionically conducting electrolyte 7.5 is in contact with the electrode assembly 7.2 i.e., the jelly roll 7.

In the example cell design shown in FIGS. 1A and 1B, and in all subsequently described configurations, the location and parts described as positive and negative may be switched, and the cell housing may be any combination of a drawn can with an attached end 4 or a tube with two attached ends 4, 4.1, and the location of the vent is preferably on one of the ends. For the sake of clarity and simplicity, the following disclosure will focus on the use of one or more conductive power rods and attendant structures that can be used with this baseline cell design.

Figure 2:
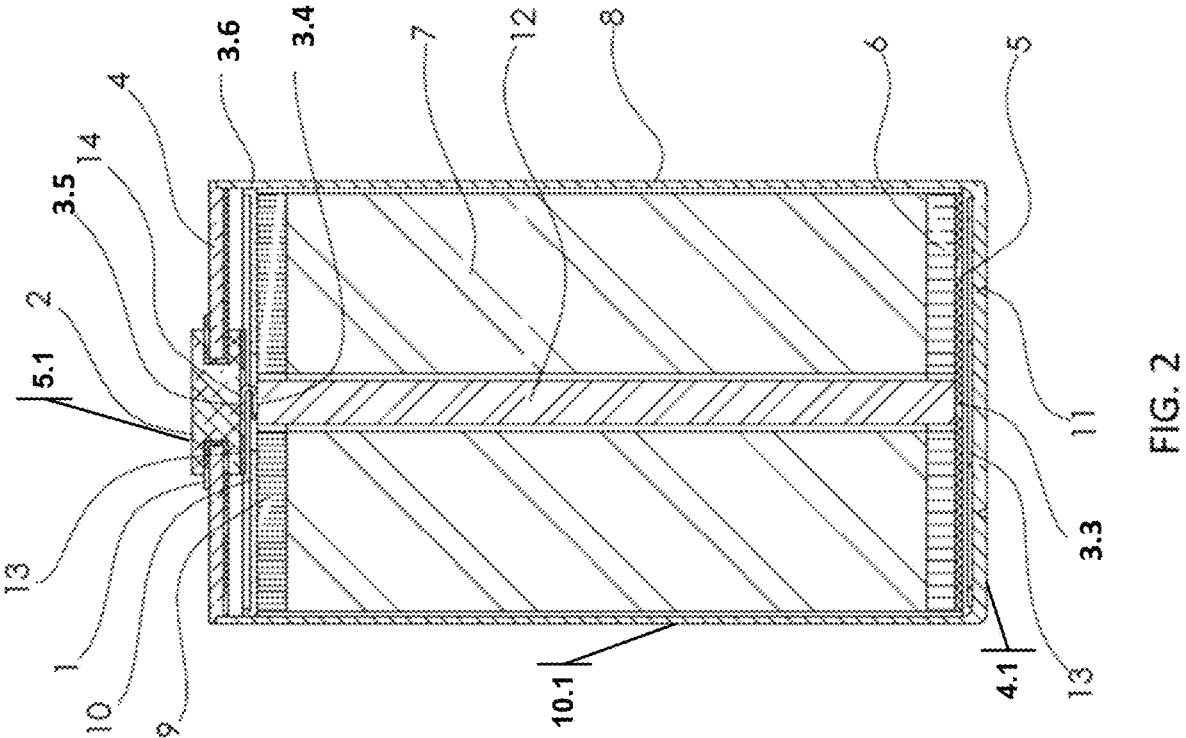
FIG. 2 illustrates a floating conductive power rod cell can design, with neither end of the power rod structurally attached to either end of cell.

FIG. 2 illustrates a floating conductive power rod cell can design, with neither end of the power rod structurally attached to either end of cell. The conductive power rod 12 is electrically and structurally attached via a contact point 3.3 to the positive electrode current collector 5 on the bottom of the cell. To prevent shorting, an electrical insulator 13 has been added between the positive current collector 5 and the negative can housing 8. The top of the conductive power rod 12 is electrically and structurally attached via a contact point 3.4 to the positive conductive tab 14, which is in turn electrically and structurally attached to the positive rivet terminal (2, 5.1) via a contact point 3.5. An electrical insulator 13 is added under the rivet 2 to prevent short-circuiting between the negative current collector 10 and the positive rivet 2. The negative electrode current collector 10 is electrically and structurally attached to the can housing 8 via an electrical weld or contact point 3.6, making the can housing 8 the negative terminal 10.1. This configuration is described as floating, since the power rod 12 is not structurally connected to either the top or bottom of the cell housing 8—the positive tab is flexible and does not provide much structural support. This floating configuration provides the following benefits: a lower-resistance electrical path for an electrode though the center of the jelly roll 7, enabling high power capability with a mechanically robust cell housing 8, the ability to incorporate a vent 11, and prevention of jelly roll 7 central void collapse.

Figures 3, 4:
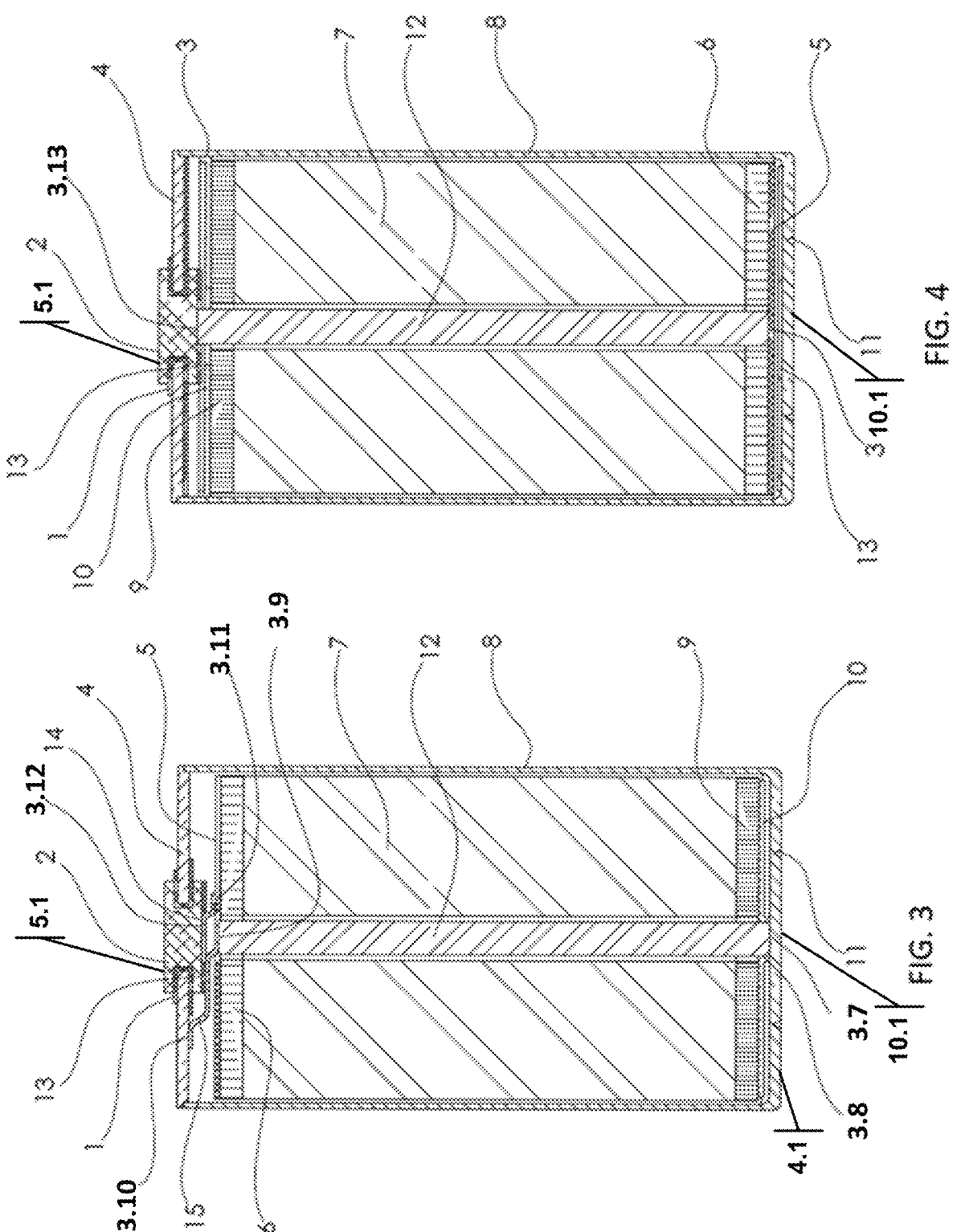
FIG. 3 illustrates a semi-floating conductive power rod cell can design, with one end of the power rod structurally and electrically attached to the bottom, negative terminal.
FIG. 4 illustrates a semi-floating conductive power rod cell can design, with one end of the power rod structurally and electrically attached to the top, positive terminal.

FIG. 3 illustrates a semi-floating conductive power rod cell can design, with one end of the power rod structurally and electrically attached to the bottom, negative terminal 10.1. The conductive power rod 12 is electrically and structurally attached to the can housing 8 via a contact point 3.7. The negative side of the jelly roll 7 is on the bottom with the negative current collector 10 electrically and structurally attached to the power rod 12 via a contact point 3.8. If the power rod 12 has less total resistance than the can walls 8, current will flow up through the power rod 12, since it is the path of least resistance—even though it has the option to flow through the can walls 8. The top of the power rod 12 is electrically and structurally attached via a contact point 3.9 to the negative conductive tab 15, which is in turn electrically and structurally attached via a contact point 3.10 to the negative end 4. A similar process follows for the positive terminal 5.1: the positive current collector 5 is structurally and electrically attached via a contact point 3.11 to the positive conductive tab 14, which is in turn electrically and structurally attached via a contact point 3.12 to the positive rivet terminal (2, 5.1). This configuration is described as semi-floating, since the power rod 12 is structurally connected to just the negative terminal 10.1—both positive 14 and negative 15 tabs do not provide structural support to resist the top end from bowing outwards under pressure. FIG. 3, depicting a semi-floating configuration, provides the following benefits: a lower-resistance electrical path for an electrode though the center of the jelly roll 7, enabling high power capability with a mechanically robust cell housing, the ability to incorporate a vent 11, more efficient cell cooling by providing a thermally conductive heat path from the center of the jellyroll 7 to the negative bottom terminal 10.1 of the cell, and prevention of jelly roll 7 central void collapse.

FIG. 4 illustrates a semi-floating conductive power rod cell can design, with one end of the power rod structurally and electrically attached to the top, positive terminal 5.1. This configuration is very similar to the floating configuration described with reference to FIG. 2; however, in this case the top of the power rod 12 is directly attached via contact point 3.13 to the positive rivet terminal (2, 5.1). This configuration is described as semi-floating, since the power rod 12 is structurally connected to just the positive terminal 5.1. FIG. 4, showing a semi-floating configuration, provides the following benefits: a lower-resistance electrical path for an electrode though the center of the jelly roll 7 enabling high power capability with a mechanically robust cell housing 8, the ability to incorporate a vent 11, more efficient cell cooling by providing a thermally conductive heat path from the center of the jelly roll 7 to the positive top terminal 5.1 of the cell, and prevention of jelly roll 7 central void collapse.

Figures 5, 6:
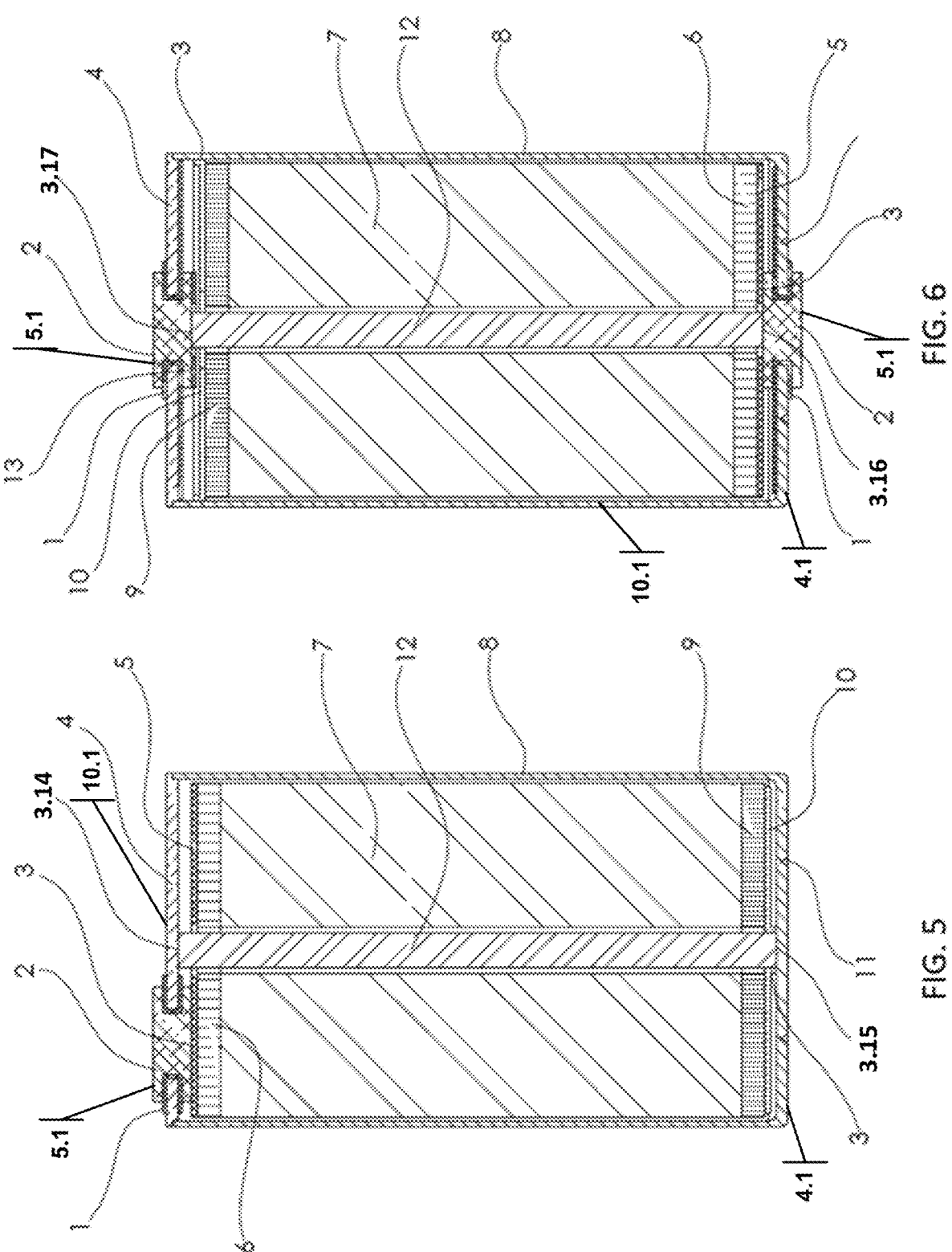
FIG. 5 illustrates a structural conductive power rod cell can design, with both ends of the power rod structurally and electrically attached to the negative terminal about the can and with an off-center positive terminal.
FIG. 6 illustrates a structural conductive power rod cell can design, with both ends of the power rod structurally and electrically attached to dual positive terminals.

FIG. 5 illustrates a structural conductive power rod cell can design, with both ends of the power rod structurally and electrically attached to the negative terminal 10.1 about the can and end 4 with an off-center positive terminal 5.1. The positive rivet terminal (2, 5.1) is off-center, which allows the conductive power rod 12 to be electrically and structurally attached to both ends of the negative cell housing 8 via contact points 3.14 and 3.15. The connections of the positive 5 and negative 10 current collectors follow that of previously mentioned configurations. This configuration is described as structural, since the power rod 12 is structurally connected to the top and bottom of the cell housing. This configuration, along with the three other structural configurations seen in FIGS. 6, 7, and 8A, provide the following benefits: a lower-resistance electrical path for an electrode though the center of the jelly roll 7, enabling high power capability with a mechanically robust cell housing 8, mechanical reinforcement of the ends (4, 4.1) to reduce deflection for a cell with a positive internal pressure, the ability to incorporate a vent 11, more efficient cell cooling by providing a thermally conductive heat path from the center of the jelly roll 7 to one or both ends (4, 4.1) of the cell housing 8, and prevention of jelly roll mandrel hole collapse.

A second example of a conductive power rod in a structural configuration is presented in FIG. 6. In this configuration, the there are two positive rivet terminals 5.1 on either end of the cell, with the power rod 12 electrically and structurally attached to both via contact points 3.16 and 3.17. The negative terminal 10.1 is comprised of the can housing 8.

Figures 7, 8A:
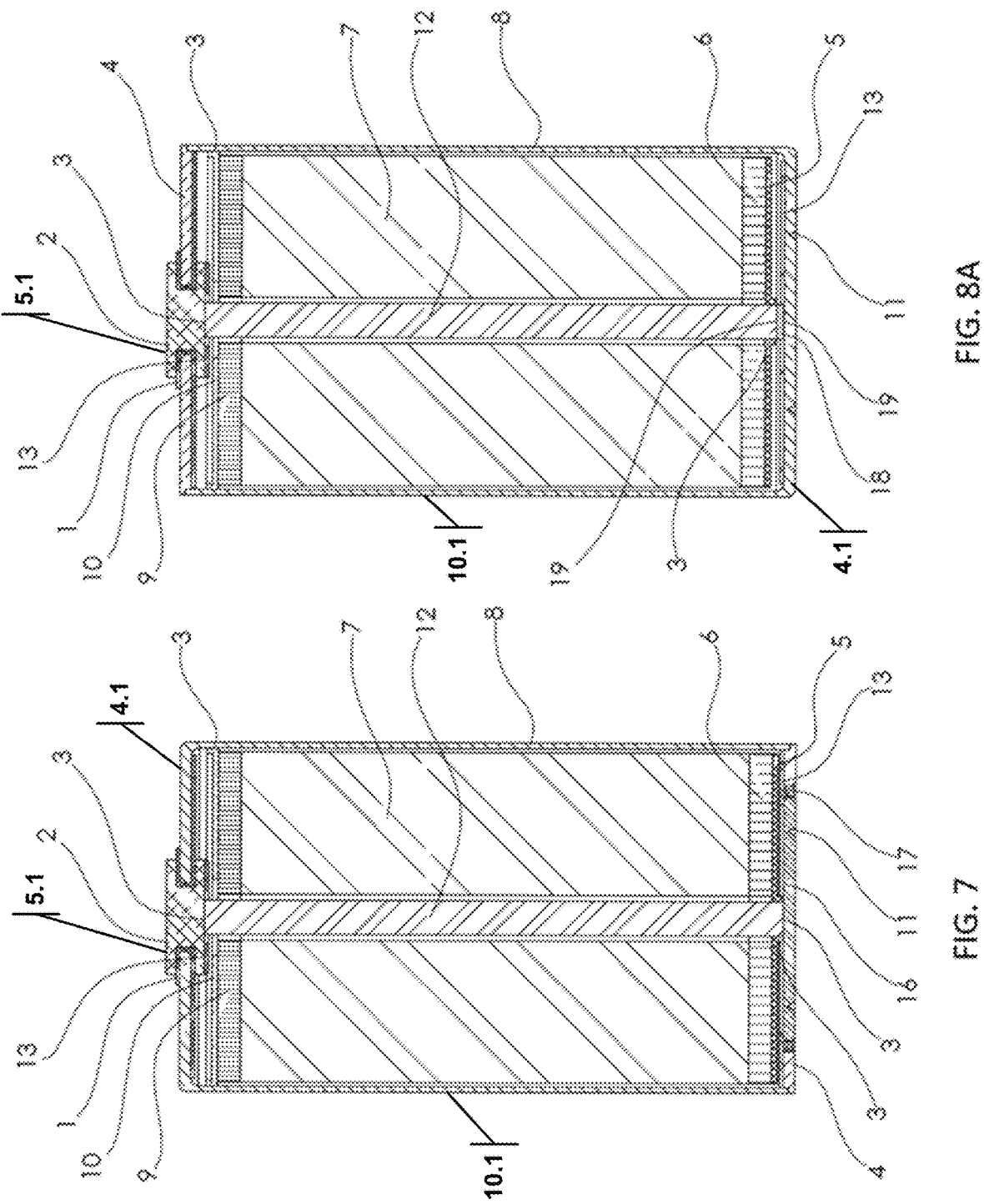
FIG. 7 illustrates a structural conductive power rod cell can design, with one end of the power rod structurally and electrically attached to the top positive terminal and with the other end attached to a cell inner lid with a gasket or a glass-insulating seal.
FIG. 8A illustrates a structural conductive power rod cell can design, with one end of the power rod structurally and electrically attached to the top positive terminal and with the other end attached to the negative bottom of the can with a bonded structural insulator preventing an electrical short.

A third example of a conductive power rod in a structural configuration is presented in FIG. 7. This configuration is like the structural configuration in FIG. 6; however, instead of a second positive rivet terminal on the bottom, the conductive power rod 12 is connected to a cell inner lid 16 on the bottom of the cell, which could also be viewed as a positive terminal. This inner lid 16 is then electrically isolated from the end 4 and can housing 8 by an electrically-insulating glass-to-metal, ceramic-to-metal, or gasket seal 17, which also forms a hermetic interface to seal the cell. The glass-to-metal, ceramic-to-metal, or gasket seal 17 may be located inside or outside the vent 11 diameter. There is also a bottom electrical insulator 13 that prevents the positive current collector 5 from short-circuiting with the negative end 4. In this embodiment, the device has a positive rivet terminal 2, 5.1 and the can housing 8 comprises the negative terminal 10.1.

A fourth example of a conductive power rod in a structural configuration is presented in FIG. 8A. This configuration is like the structural configuration in FIG. 7; however, the bottom of the conductive power rod 12 is attached to a bonded structural insulator 18 via electrically-insulated mechanically bonded surfaces 19 on either end of the insulator 18, thereby attaching the power rod 12 to bottom of the can housing 8 structurally while maintaining electrical isolation to prevent short-circuiting. Again, there is a bottom electrical insulator 13 that prevents the positive current collector 5 from short-circuiting with the bottom can housing 8.

Figure 8C:
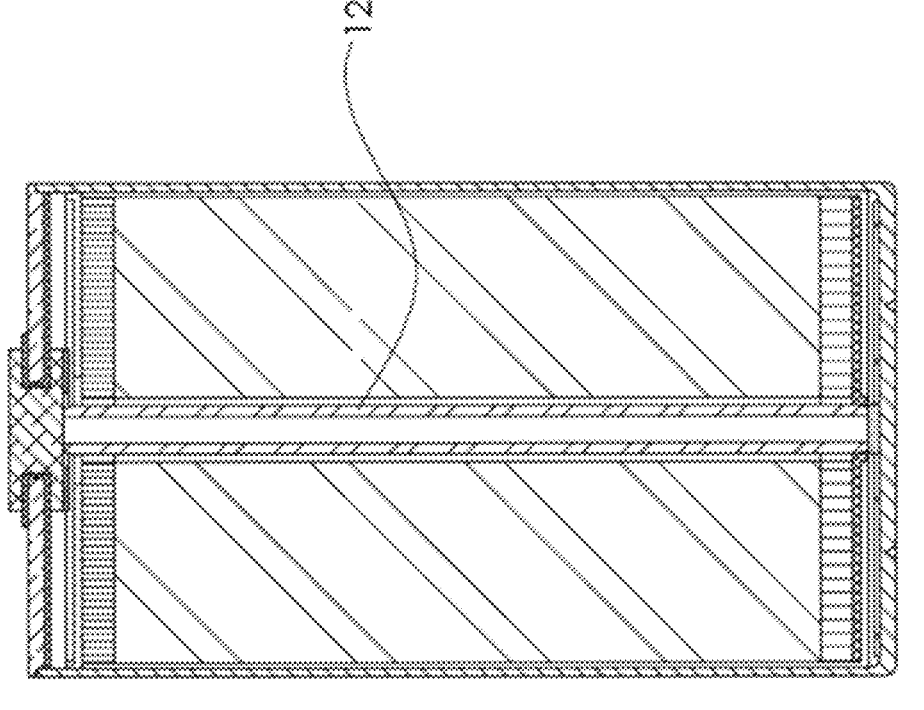
FIG. 8C illustrates the cell can of FIG. 8A with an alternate hollow conductive power rod.
Figure 8B:
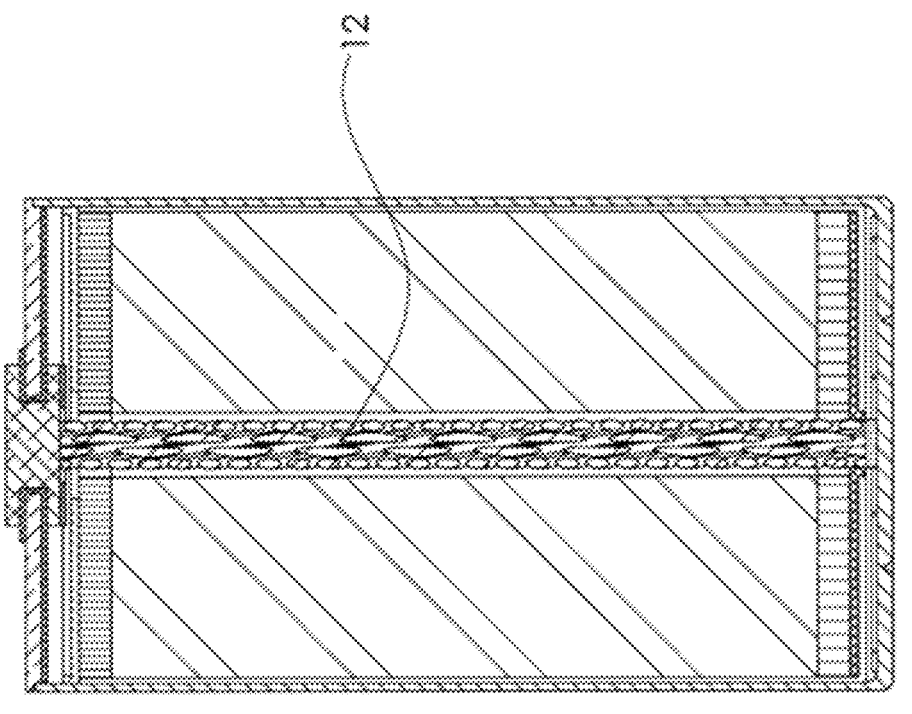
FIG. 8B illustrates the cell can of FIG. 8A with an alternate cable conductive power rod.

FIGS. 8B and 8C show non-limiting examples of an alternate conductive power rod 12 as a cable (stranded or not) and a hollow pin, respectively. In addition, the conductive power rod 12 may have, but is not limited to, a round, square, hexagonal, triangular, tubular, round slotted, flexure enabled, or center-notched cross-section design. The conductive power rod 12 may be made from, but is not limited to, conductive material such as carbon steel, stainless steel, copper, aluminum, molybdenum, titanium, or similar, or alloys therein. Preferably, the material is of high conductivity, such as copper or aluminum, to match the preferred metal for either positive or negative electrode. The conductive power rod can be connected to a component in the cell assembly via laser welding, spot welding, sonic welding, soldering, brazing, or other bonding, or fusion processes. These form factors and attachment methods are applicable to any combination of the configurations presented.

The following describes how conductive power rods can be integrated into a cell design while still maintaining the ability to include a safety vent or burst disk to relieve pressure during an internal cell over pressurization event. The examples given will use FIG. 8A to illustrate various conductive power rods, enabling cell venting; however, they are applicable to all structural conductive power rod configurations.

Figure 8D:
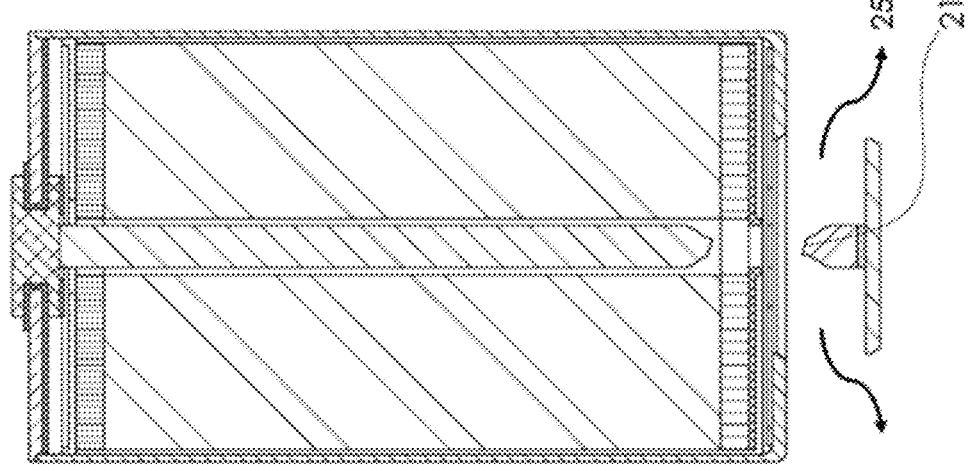
FIG. 8D illustrates the cell can of FIG. 8A with a notched power rod that will fracture as the bottom cell vent opens, allowing a pressure relief path.
Figure 8D:
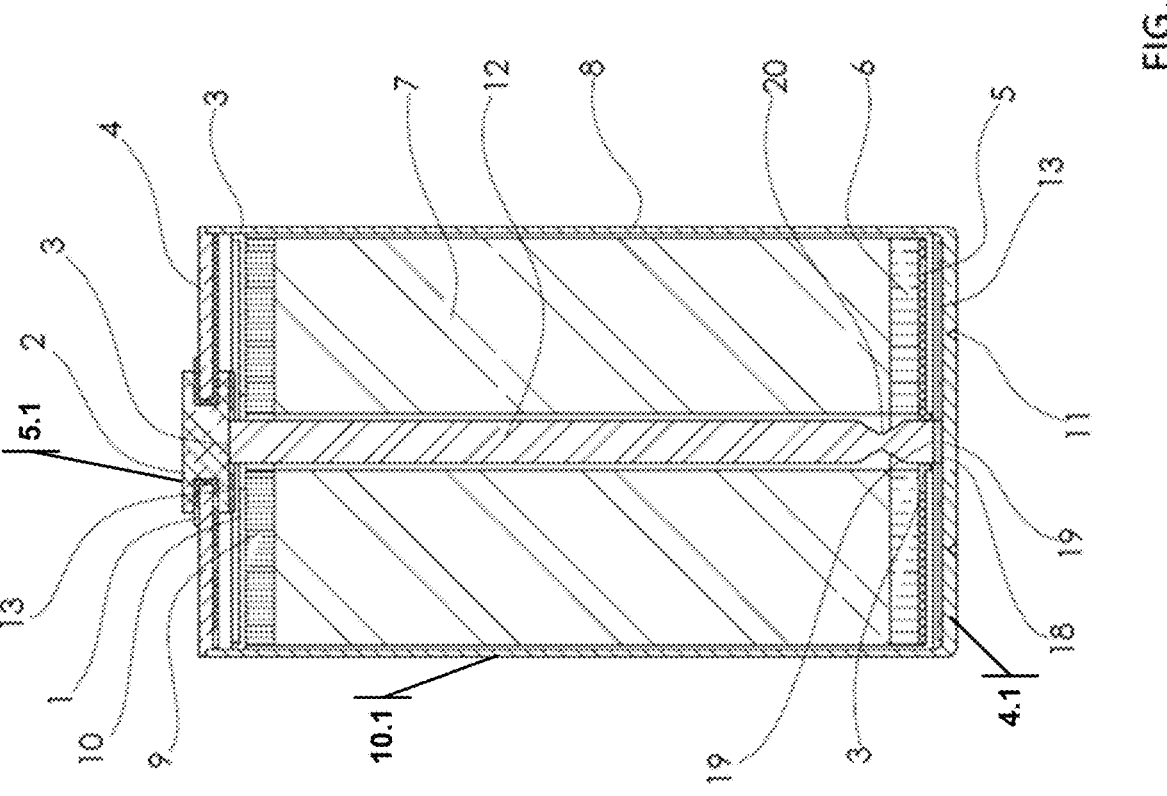

FIG. 8D shows a conductive power rod 12 with a notch feature 20 or weakened section that will fail and disconnect or fracture once a specified pressure threshold is exceeded to allow the battery to safely vent excess pressure. The conductive power rod provides the current path to the positive terminal 5.1 (the negative terminal 10.1 is comprised of the can housing 8). When there is an increase in internal cell pressure, the force applied to the inside of the cell is also applied to the cell can ends (4, 4.1). This will translate to a force being applied on the conductive power rod 12. Under enough tension, the weakened notched portion of the conductive power rod 12 will fracture 21, leading to electrical disconnect of the positive terminal 5.1, acting as an additional safety mechanism in the form of a CID. Further, without the additional mechanical support on the end 4 from the conductive power rod 12, the end 4 may further mechanically deflect and may be designed to either allow or not allow for cell opening or cell venting. It would be beneficial to configure the cell such that when the internal pressure of the cell is high enough, the force from one or both cell ends (4, 4.1) acting on the conductive power rod 12 is sufficient to fracture the conductive power rod 12, causing the end to mechanically open and release the high pressure from within the cell at the newly-created pressure-relief path 25. This permits the cell to vent safely under a high internal-pressure event, with the added benefit of a CID.

Figure 8E:
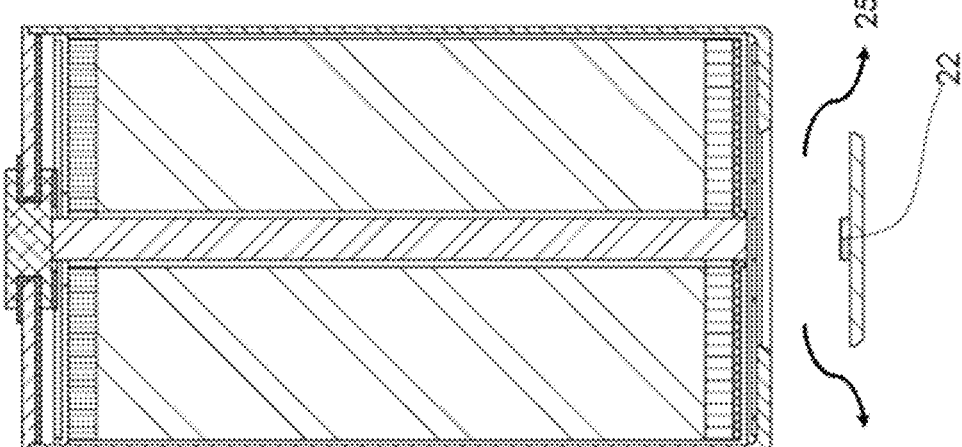
FIG. 8E illustrates the cell can of FIG. 8A that will fail about the power rod bonded surface as the bottom cell vent opens, allowing a pressure relief path.
Figure 8E:
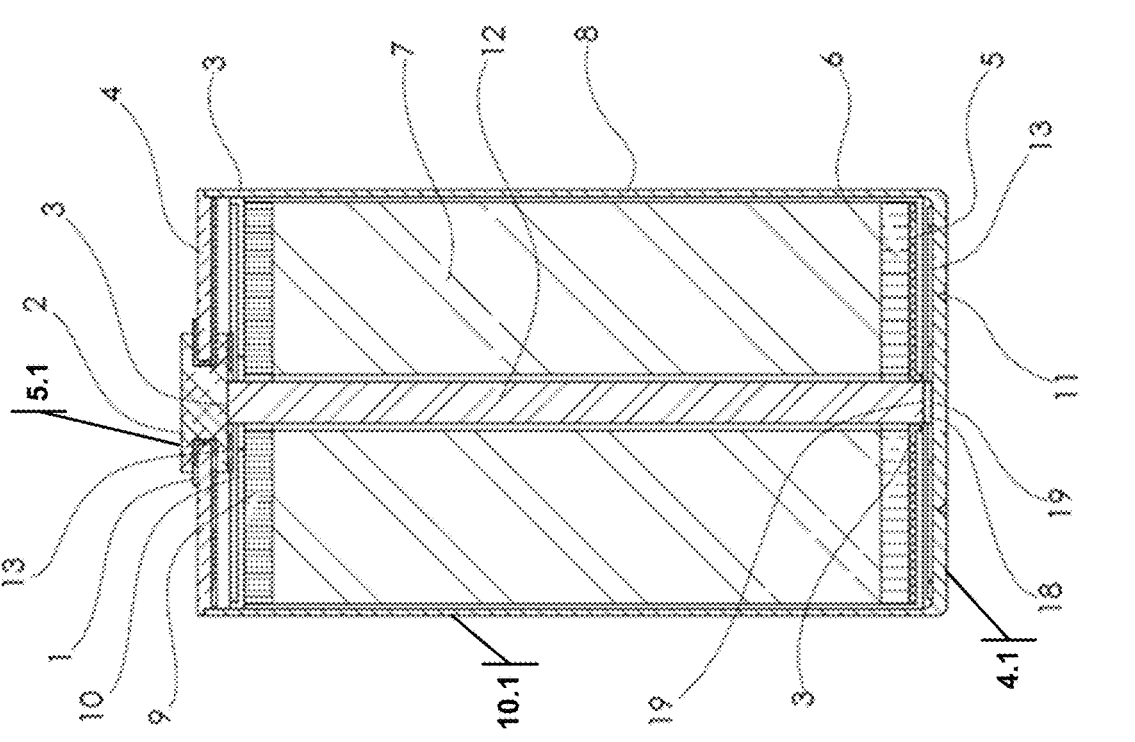

Like FIG. 8D, shown in FIG. 8E is a conductive power rod 12 designed to allow safe venting of the cell; however, in this case, instead of a weakened notch section failing, the bonded surface 19 between the power rod 12 and the bonded structural insulator is tuned to fail or delaminate when a specified pressure threshold is exceeded. On the right side of FIG. 8E, the power rod bonded surface 19 failure point 22 is shown, along with the newly-created pressure-relief path 25.

Figure 8F:
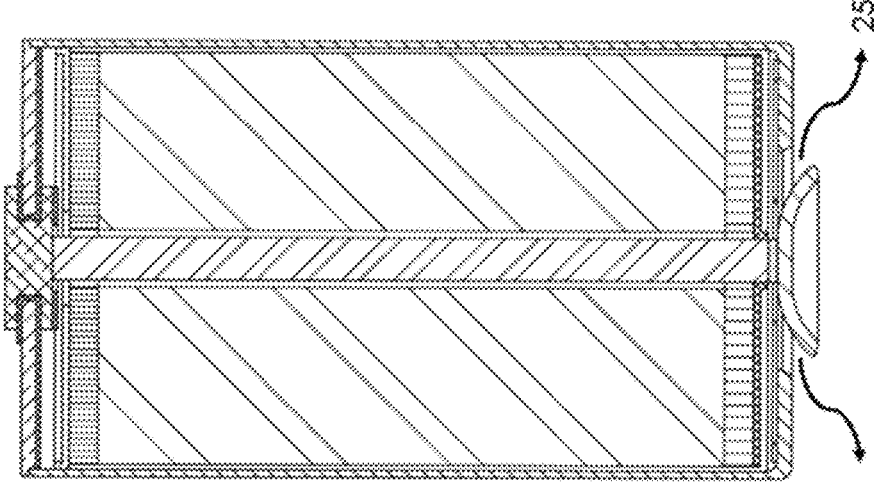
FIG. 8F illustrates the cell can of FIG. 8A with a bottom cell vent opening that bows under pressure to allow a pressure relief path while preventing cell housing components from being ejected.
Figure 8F:
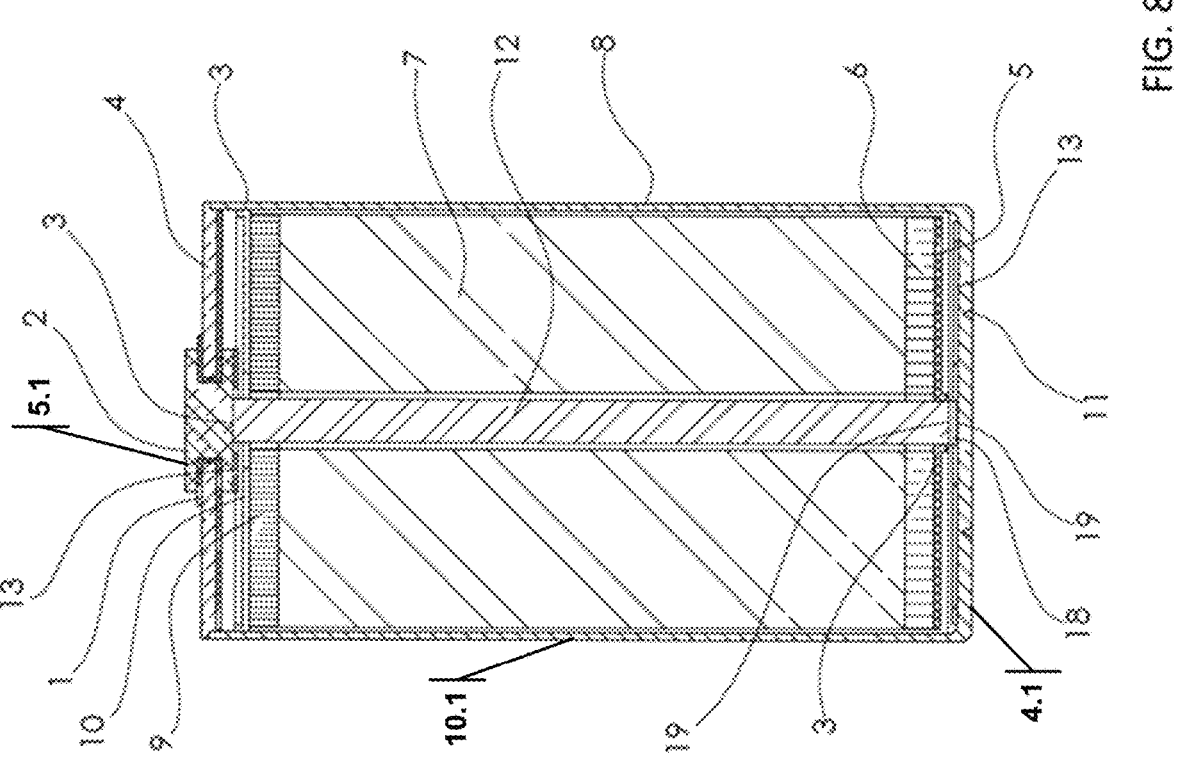

Unlike the intentional power rod bonded-surface failure described in FIG. 8E, FIG. 8F shows a configuration where the power rod 12 and bonded surface 19 is sufficiently strong to maintain mechanical contact on both ends of the cell housing 8. This would enable the vent 11 to open like an umbrella, providing a pressure-relief path 25 while remaining attached to the power rod 12, and preventing a projectile from ejecting from the cell.

Figure 8G:
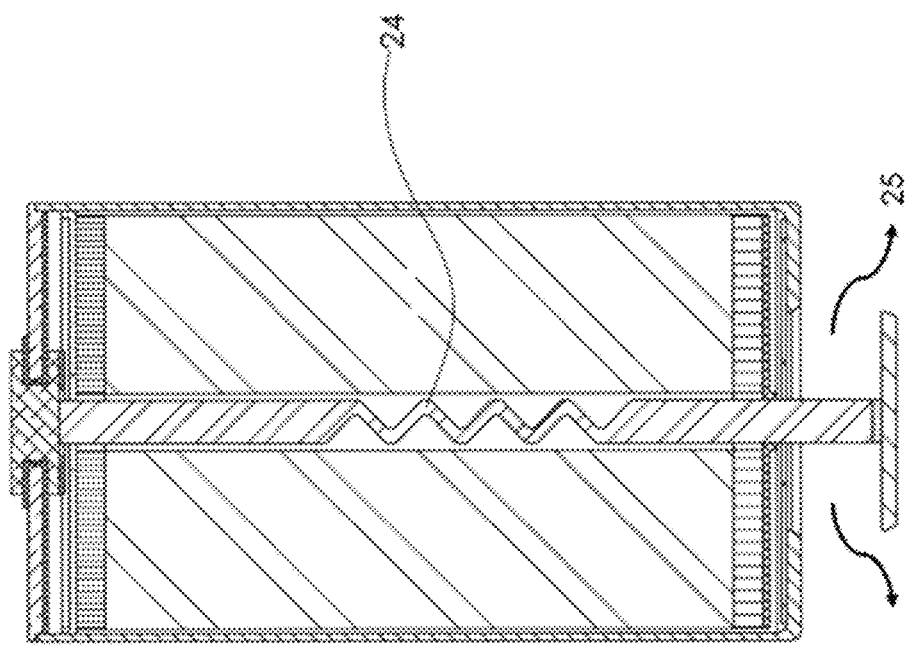
FIG. 8G illustrates the cell can of FIG. 8A with an alternate power rod containing a flexure element that will extend as the bottom cell vent opens, allowing a pressure relief path while preventing cell housing components from being ejected.
Figure 8G:
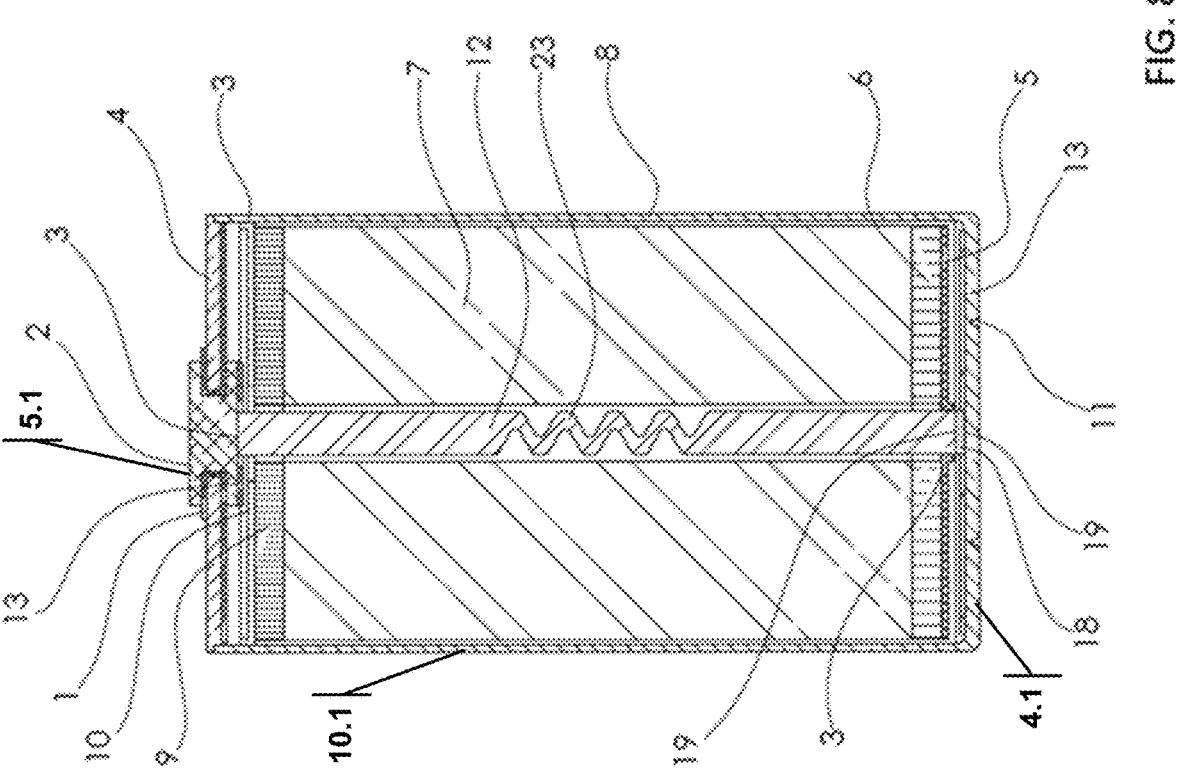

Finally, FIG. 8G illustrates another design of the conductive power rod that permits venting without ejecting a projectile. In this configuration, the conductive power rod 12 contains a flexure element 23 along its axis. As pressure builds in the cell, the flexure element 23 elongates, opening a vent to allow the electrolyte to escape to safely disable the battery while preventing a projectile. Shown on the right side of FIG. 8G is the flexure element in this extended state 24 allowing a pressure-relief path 25.

While this document contains many specifics, these should not be construed as limitations on the scope of any invention or of what may be claimed, but rather as descriptions of features that may be specific to a particular embodiment of the invention. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

The invention claimed is:
1. An electrochemical energy storage device comprising:
   an electrode assembly (7.2) comprising:
      a separator (7.1) separating a positive electrode (6) and a negative electrode (9), wherein the separator (7.1), the positive electrode (6) and the negative electrode (9) are radially coiled about a central axis (7.3) forming a central void (7.4);

a positive electrode current collector (5) in electrical contact with the positive electrode (6);

a negative electrode current collector (10) in electrical contact with the negative electrode (9); and a conductive power rod (12) comprised of a cable and disposed in the central void (7.4), the conductive power rod (12) providing structural support to prevent the collapse of the central void (7.4) and either:

a. in electrical contact with the positive electrode current collector (5) and providing an electrical connection with a positive terminal (5.1); or b. in electrical contact with the negative electrode current collector (10) and providing an electrical connection with a negative terminal (10.1);

wherein the positive terminal (5.1) is electrically isolated from the negative terminal (10.1);

a can housing (8) enclosing the electrode assembly (7.2), the positive electrode current collector (5), the negative electrode current collector (10) and the conductive power rod (12), and further comprises an end (4) and a second end (4.1), and wherein the conductive power rod (12) is connected to the end (4) and second end (4.1) such that the rod (12) provides structural support to the can housing (8) to prevent deflection of the end (4) and the second end (4.1) when the device experiences above-normal operating internal pressure.

2. The electrochemical energy storage device of claim 1, wherein the can housing (8) comprises either the positive terminal (5.1) or the negative terminal (10.1).

3. The electrochemical energy storage device of claim 1, wherein the can housing (8) comprises a vent (11) constructed to open when the device experiences above-normal operating internal pressure.

4. The electrochemical energy storage device of claim 3, wherein the conductive power rod (12) is connected to the vent (11).

5. The electrochemical energy storage device of claim 1, wherein the conductive power rod (12) comprises a notch (20) constructed to fracture when the device experiences above-normal operating internal pressure, and wherein the fracture severs the electrical connection.

6. The electrochemical energy storage device of claim 1, comprising a rivet (2) wherein the rivet (2) comprises either the positive terminal (5.1) or the negative terminal (10.1).

7. The electrochemical energy storage device of claim 1, comprising an ionically conducting electrolyte (7.5) in contact with the electrode assembly (7.2).

8. The electrochemical energy storage device of claim 7, wherein the ionically conducting electrolyte (7.5) comprises a liquid or a liquefied gas.

9. The electrochemical energy storage device of claim 7, wherein the device is a battery or a capacitor.

10. The electrochemical energy storage device of claim 1, wherein the conductive power rod (12) is hollow.

11. The electrochemical energy storage device of claim 1, wherein the conductive power rod (12) comprises carbon steel, stainless steel, copper, aluminum, molybdenum, titanium, or alloys thereof.

\* \* \* \* \*